(12) United States Patent
Sonoda et al.

(10) Patent No.: US 8,754,601 B2
(45) Date of Patent: Jun. 17, 2014

(54) CONTROLLER AND CONTROL METHOD OF SYNCHRONOUS MOTOR WITH AMPLIFIER PROTECTION FUNCTION

(71) Applicant: Fanuc Corporation, Yamanashi (JP)

(72) Inventors: Naoto Sonoda, Yamanashi (JP); Yasusuke Iwashita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/916,836

(22) Filed: Jun. 13, 2013

(65) Prior Publication Data

US 2013/0342143 A1   Dec. 26, 2013

(30) Foreign Application Priority Data

Jun. 22, 2012   (JP) ................. 2012-140572

(51) Int. Cl.
*H02H 7/08* (2006.01)
*H02P 1/04* (2006.01)

(52) U.S. Cl.
USPC ............ 318/400.21; 318/400.09; 318/400.15; 318/516

(58) Field of Classification Search
USPC ............. 318/400.21, 700, 400.07, 400.09, 318/400.15, 456, 457, 461, 514, 515
See application file for complete search history.

(56) References Cited

U.S. PATENT DOCUMENTS

| | | | | |
|---|---|---|---|---|
| 4,649,328 A | * | 3/1987 | Leonard et al. | 318/271 |
| 6,252,369 B1 | * | 6/2001 | Kaku et al. | 318/609 |
| 6,369,538 B1 | * | 4/2002 | Youn et al. | 318/362 |
| 7,289,915 B2 | * | 10/2007 | Ide | 702/41 |
| 7,860,624 B2 | * | 12/2010 | Kubota et al. | 701/41 |
| 7,902,780 B2 | | 3/2011 | Okita et al. | |
| 8,120,302 B2 | * | 2/2012 | Zhang et al. | 318/609 |

FOREIGN PATENT DOCUMENTS

| | | |
|---|---|---|
| JP | 08-149870 | 6/1996 |
| JP | 11-206184 | 7/1999 |
| JP | 2002-369564 A | 12/2002 |
| JP | 2007-174729 A | 7/2007 |
| JP | 2008-306901 | 12/2008 |
| JP | 2010-148178 A | 7/2010 |

* cited by examiner

*Primary Examiner* — Bentsu Ro
*Assistant Examiner* — Thai Dinh
(74) *Attorney, Agent, or Firm* — Lowe Hauptman & Ham, LLP

(57) ABSTRACT

The controller of the synchronous motor of the present invention includes: an allowable energy value acquisition unit (4) which acquires an allowable energy value until which a dynamic brake resistor, which is for short-circuiting the input terminal of the synchronous motor at a time of failure, can bear; an inertia estimation unit (6) which estimates inertia of a driven object based on a speed value and an electric current value; an allowable maximum speed calculation unit (5) which calculates an allowable maximum speed value of the synchronous motor from the inertia and the allowable energy value; and a speed control unit (2) which controls the amplifier for operating the synchronous motor at a predetermined commanded speed, in which the speed control unit (2) acquires the allowable maximum speed value from the allowable maximum speed calculation unit (5), and limits the commanded speed to the allowable maximum speed value or lower.

4 Claims, 6 Drawing Sheets

CONTROLLER AND CONTROL METHOD OF SYNCHRONOUS MOTOR WITH AMPLIFIER PROTECTION FUNCTION

This application is a new U.S. patent application that claims benefit of JP 2012-140572, filed on Jun. 22, 2012, the content of JP 2012-140572 is incorporated herein by reference.

FIELD OF THE INVENTION

The present invention relates to a controller and a control method of synchronous motors and, in particular, relates to a controller and a control method of synchronous motors with an amplifier protection function.

BACKGROUND OF THE INVENTION

In a system driven by a synchronous motor, such as a machine tool, the drive unit of the synchronous motor is required to be immediately stopped for safety reasons in the event of a failure of the synchronous motor. In the event of a failure, such as emergency stop or blackout, the servo amplifier performs a power-generating brake by short-circuiting the input terminal of the synchronous motor with dynamic brake (hereinafter, "DB") resistance. The DB is configured by a resistor, and converts electric power collected from the electric motor to thermal energy through the DB circuit. Thus, depending on the operating condition of the synchronous motor, the rotation energy of the synchronous motor might exceed allowable energy of the DB resistor of the servo amplifier, bringing a possibility of damaging the DB resistor by heat.

When immediately stopping a synchronous motor using a DB circuit, if the rotation energy of the synchronous motor is assumed to be completely consumed by the DB resistor, the following formula (1) must be satisfied to protect the DB resistor:

$$Em < Ea \quad (1)$$

where, Em [J] is the rotation energy of a synchronous motor, and Ea [J] is the allowable energy of the DB resistor.

Further, Em is given by the following formula:

$$Em = 0.5 \times J \times \omega^2 \quad (2)$$

where, J [kgm$^2$] is the inertia of the synchronous motor and the inertia of a driven object; ω [rad/s], the speed of the synchronous motor.

In a system driven using a synchronous motor, such as a machine tool, particularly with a driven object including a rotation table which mounts a variety of workpieces, the inertia of the driven object changes depending on the workpiece. As the rotation energy of the synchronous motor is determined by the inertia of the driven object as indicated by the formula (1), it is necessary to accurately estimate the inertia of the driven object.

Thus, there has been proposed a method of estimating inertia. For example, according to the method described in JP-A-2010-148178, the time constant of acceleration/deceleration and a speed gain can be optimized using the estimated result of inertia. However, in general, it is not easy to accurately estimate the inertia of a driven object, and, thus, whether the above formula (1) is satisfied or not is often difficult to judge.

Thus, there has been proposed a method of protecting a DB circuit without calculating inertia. In a conventional technique described in JP-A-2002-369564, the DB circuit is protected by calculating energy consumption of the DB circuit based on the speed of the synchronous motor at the time when operation of the DB circuit is started and time elapsed until the synchronous motor has decelerated to a predetermined speed.

Alternatively, another method of protecting a DB circuit without calculating inertia has been known. The conventional technique described in JP-A-2007-174729 protects a DB circuit by calculating energy consumption of the DB circuit based on the speed of the synchronous motor, the DB resistance, and the induced voltage constant of the synchronous motor.

In the methods described in JP-A-2002-369564 and JP-A-2007-174729, while inertia of a driven object is not required to be calculated, energy consumption of a DB circuit is consecutively calculated at sampling periods from the start of operation of the DB circuit. Then, only when the energy consumption of the DB circuit exceeds the allowable value, the operation of the DB circuit is terminated and the motor becomes a free-run state, which brings a problem where a distance until decelerating and stopping becomes long or time required for decelerating and stopping becomes long.

In an attempt to protect the DB circuit of a servo amplifier incorporating a DB resistor, the present invention aims to provide a controller for synchronous motors, which estimates the inertia of a driven object which is connected with the synchronous motor and limits the speed (maximum rotation number) of the synchronous motor using the estimated result.

SUMMARY OF THE INVENTION

The controller of the synchronous motor according to an embodiment includes: an allowable energy value acquisition unit which acquires an allowable energy value until which a dynamic brake resistor can bear, the dynamic brake resistor is for short-circuiting an input terminal of the synchronous motor at a time of failure; an inertia estimation unit which estimates inertia of a driven object based on a speed value which is fed back from the synchronous motor while the synchronous motor is driving the driven object and an electric current value which is fed back from an amplifier and input to the synchronous motor; an allowable maximum speed calculation unit which calculates an allowable maximum speed value of the synchronous motor from the inertia and the allowable energy value; and a speed control unit which controls the amplifier for operating the synchronous motor at a predetermined commanded speed, in which the speed control unit acquires the allowable maximum speed value from the allowable maximum speed calculation unit, and limits the commanded speed to the allowable maximum speed value or lower.

The controller of the synchronous motor according to another embodiment, preferably further includes: an alarm unit which acquires the speed value and the allowable maximum speed value, and alarms when the speed of the synchronous motor exceeds the allowable maximum speed value.

The controller of the synchronous motor according to still another embodiment, preferably further includes: a deceleration stop unit which transmits a stop command to the speed control unit for deceleration-stopping the synchronous motor according to the alarm from the alarm unit when the speed of the synchronous motor exceeds the allowable maximum speed value.

The control method of a synchronous motor according to an embodiment includes the steps of: acquiring an allowable energy value until which a dynamic brake resistor can bear, the dynamic brake resistor is for short-circuiting an input terminal of the synchronous motor at a time of failure; estimating inertia of a driven object based on a speed value which is fed back from the synchronous motor while the synchronous motor is driving the driven object and an electric current value which is fed back from an amplifier and input to the synchronous motor; calculating an allowable maximum speed value of the synchronous motor from the inertia and the allowable energy value; controlling the amplifier for operating the synchronous motor at a predetermined commanded speed; and acquiring the allowable maximum speed value from the allowable maximum speed calculation unit and limiting the commanded speed to the allowable maximum speed value or lower.

According to the present invention, the inertia of a driven object which fluctuates when workpieces are replaced is estimated, the maximum value of the rotation speed of the synchronous motor is determined using the estimated result, and the speed thereof is always limited to the maximum speed even at normal operation, whereby the DB resistor can be protected in case of failure.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

With reference to the drawings, the following will describe the controller and the control method of the synchronous motor having an amplifier protection function according to the present invention. However, it should be noted that the technical scope of the present invention is not limited to the embodiments below, and covers the invention described in the appended claims as well as equivalents thereto.

First Embodiment

Figure 1:
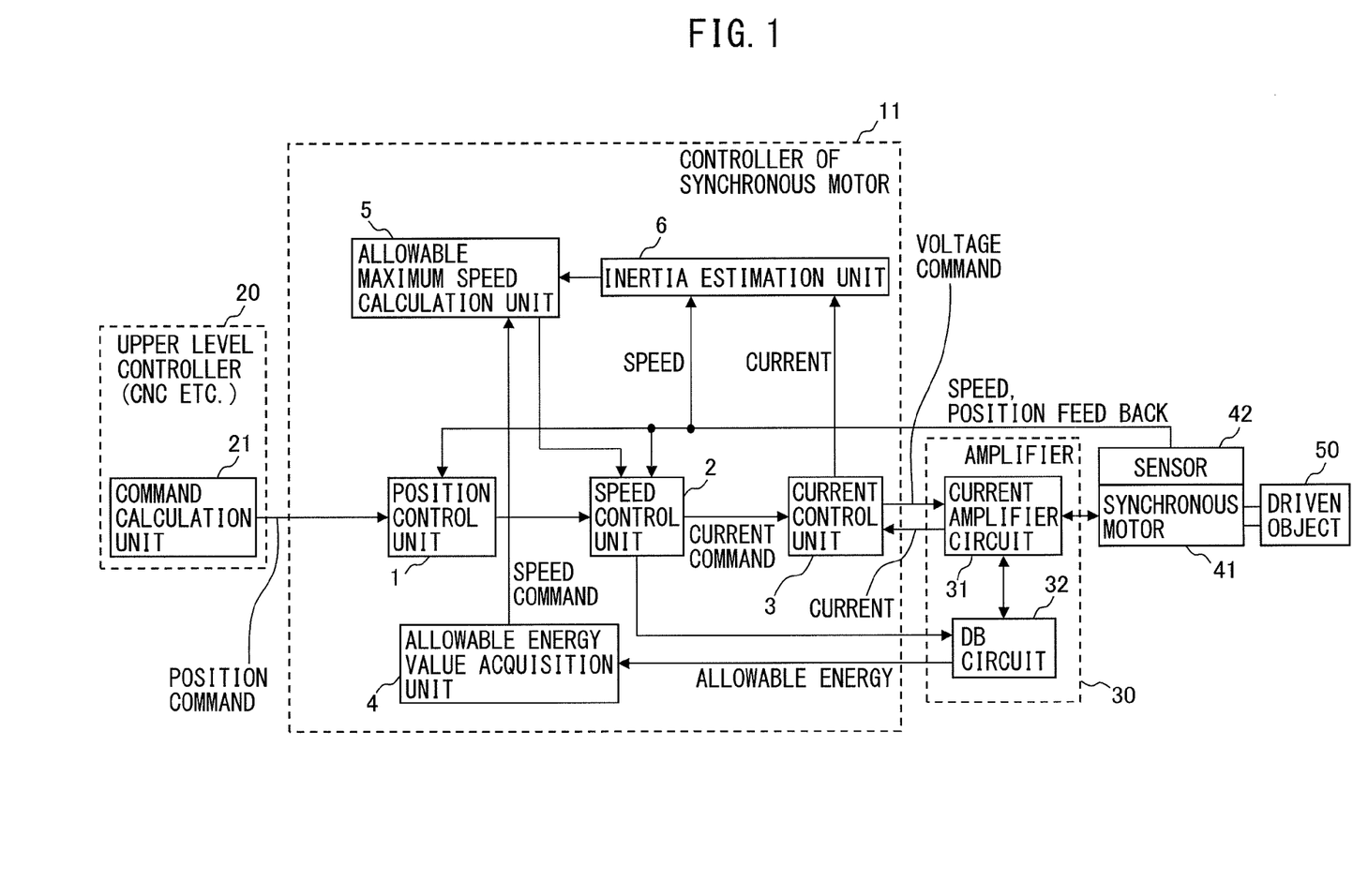
FIG. 1 is a block view illustrating a configuration of the controller of the synchronous motor according to a first embodiment of the invention.

FIG. 1 illustrates a block view representing a configuration of the controller of the synchronous motor according to a first embodiment. The controller 11 of the synchronous motor according to the first embodiment (hereinafter, simply referred to as the "controller") causes the synchronous motor 41 which drives a driven object 50 to operate at a predetermined commanded speed by controlling the amplifier 30 according to a position command from an upper level controller 20, such as a Computer Numerical Control (CNC) device.

Specifically, first, a position control unit 1 provided in the controller 11 receives a position command transmitted from a command calculation unit 21 provided in the upper level controller 20. The position control unit 1 transmits a speed command to a speed control unit 2 according to the received position command. The speed control unit 2 transmits a current command to a current control unit 3 according to the received speed command. The current control unit 3 transmits a voltage command to a current amplifier circuit 31 which configures the amplifier 30 for driving the synchronous motor 41. The synchronous motor 41 operates at a predetermined commanded speed by power input from the current amplifier circuit 31 to drive the driven object 50.

The synchronous motor 41 is provided with a sensor 42 for detecting the speed and position of the synchronous motor 41. The data relating to the speed and position detected by the sensor 42 is respectively fed back to the position control unit 1, the speed control unit 2, and the inertia estimation unit 6, as will be described hereinafter, inside the controller 11.

The amplifier 30 is provided with a DB circuit 32 for short-circuiting the input terminal of the synchronous motor 41 with dynamic brake (DB) resistance at a time of failure. The amplifier 30 is provided with a storage unit (not illustrated) which stores an allowable energy value until which the DB resistor can bear. While, in the first embodiment, the allowable energy value is stored in a storage provided inside the amplifier 30, without limitation to this, the allowable energy value may be set by inputting using an input device outside of the controller 11.

The controller of the synchronous motor 11 according to the first embodiment of the invention includes: an allowable energy value acquisition unit 4 which acquires an allowable energy value until which the DB resistor, which is for short-circuiting the input terminal of the synchronous motor 41 at a time of a failure, can bear; an inertia estimation unit 6 which estimates the inertia of a driven object based on a speed value which is fed back from the synchronous motor 41 while the synchronous motor 41 is driving the driven object 50 and an electric current value which is fed back from an amplifier 30 and input to the synchronous motor 41; an allowable maximum speed calculation unit 5 which calculates an allowable maximum speed value of the synchronous motor 40 from the inertia and the allowable energy value, a speed control unit 2 which controls the amplifier 30 for operating the synchronous motor 41 at a predetermined commanded speed, in which the speed control unit 2 acquires the allowable maximum speed value from the allowable maximum speed calculation unit 5, and limits the commanded speed to the allowable maximum speed value or lower.

Next, the control method of the synchronous motor according to the first embodiment of the invention will be described. The control method of the synchronous motor according to the first embodiment of the invention includes the steps of: acquiring an allowable energy value until which the DB resistor, which is for short-circuiting the input terminal of the synchronous motor 41 at a time of failure, can bear; estimating inertia of a driven object 50 based on a speed value which is fed back from the synchronous motor 41 when the synchronous motor 41 is driving the driven object 50 and an electric current value which is fed back from an amplifier 30 and input to the synchronous motor 41; calculating an allowable maximum speed value of the synchronous motor 41 from the inertia and the allowable energy value; controlling the amplifier 30 for operating the synchronous motor 41 at a predetermined commanded speed; and acquiring the allowable maximum speed value from the allowable maximum speed calculation unit 5 and limiting the commanded speed to the allowable maximum speed value or lower.

Figure 2:
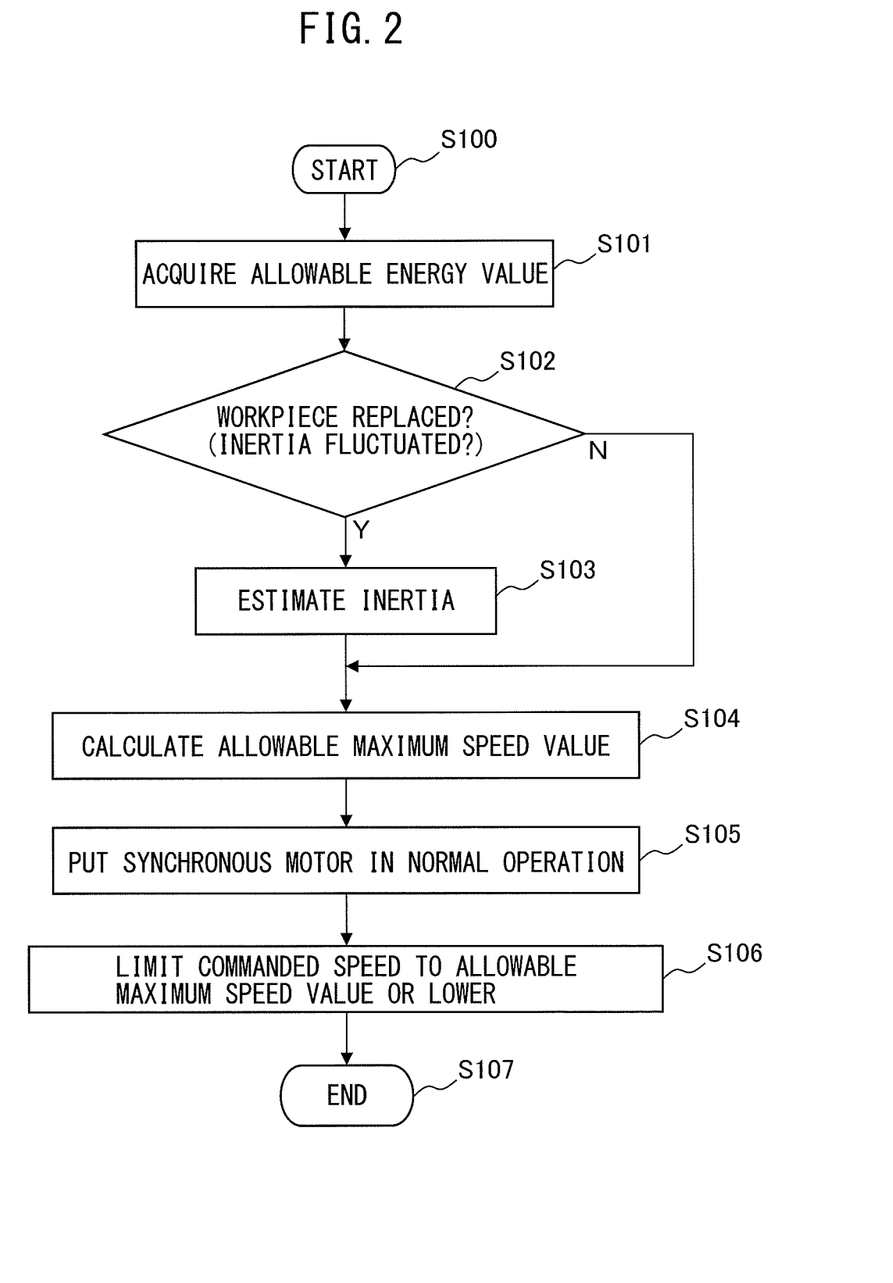
FIG. 2 is a flowchart illustrating the control method of the synchronous motor according to the first embodiment of the invention.

FIG. 2 illustrates a flowchart illustrating a procedure of the control method of the synchronous motor according to the first embodiment of the invention. At Step S101, the allowable energy value acquisition unit 4 acquires an allowable energy value Ea until which the DB resistor can bear from the amplifier 30. If excessive energy is input to the DB resistor, the DB resistor might possibly be damaged by heat. The maximum energy until which the DB resistor does not get damaged is defined as an allowable energy. The amplifier 30 is provided with a storage (not illustrated) which stores the allowable energy value of the DB resistor. In the first embodiment, the allowable energy value of the DB resistor is acquired from the amplifier 30, without limitation to this. However, the allowable energy value of the DB resistor may be set by inputting using an input device outside of the controller 11 to the allowable energy value acquisition unit 4.

Next, at Step S102, the allowable maximum speed calculation unit 5 determines whether a workpiece included in the driven object 50 has been replaced or not. That is, the allowable maximum speed calculation unit 5 determines whether or not the inertia of the driven object 50 has fluctuated due to the replacement of the workpiece. As will be described hereinafter, while the allowable maximum speed calculation unit 5 calculates the allowable maximum speed from the inertia of the driven object 50 and the allowable energy value of the DB resistor, if the inertia has not fluctuated, the inertia used in the past can still be used to calculate the allowable maximum speed. It should be noted that whether the driven object 50 has been replaced or not can be detected by providing a sensor nearby the driven object 50. However, without limitation to this, an input device outside of the controller 11 may be used to input information representing that the workpiece has been replaced to the controller 11.

If it is determined that the workpiece has not been replaced at Step S102, skipping Step S103, Step S104 is carried out. On the other hand, if it is determined that the workpiece has been replaced at Step S102, the inertia estimation unit 6 estimates the inertia of the driven object based on the speed value which is fed back from the synchronous motor 41 while the synchronous motor 41 is driving the driven object 50 and the current value which is fed back from the amplifier 30 and input to the synchronous motor 41, at Step S103.

The inertia of a driven object J [kgm$^2$] can be calculated from the following formula using a current value I [A], an acceleration value a [rad/s$^2$], a speed value ω [rad/s], and a torque constant Kt of the synchronous motor:

$$J = Kt \times I/a = Kt \times I/(d\omega/dt) \tag{3}$$

The calculation method of an acceleration value a=dω/dt in a formula (3) will be described. Suppose the sensor feeds back at a sampling period T a speed value ω(t) at certain time t. The acceleration value a can be calculated by a=(ω(t)−ω(t−T))/T using a difference between the speed value ω(t) fed back at certain time t and a speed value ω(t−T) which was fed back at time (t−T) which is one sampling period before.

Next, at Step S104, the allowable maximum speed calculation unit 5 calculates an allowable maximum speed value of the synchronous motor 41 from the inertia J and allowable energy value Ea. The inertia J is calculated using a formula (3) at Step S103, and the allowable maximum speed calculation unit 5 acquires the calculated inertia J from the inertia estimation unit 6. The allowable energy value Ea is acquired by the allowable energy value acquisition unit 4 at Step S101, and the allowable maximum speed calculation unit 5 acquires it from the allowable energy value acquisition unit 4.

The following relational expression holds among the allowable energy Ea [J] of a DB resistor, the inertia of a driven object J [kgm$^2$], and an allowable maximum speed value $\omega_{max}$ [rad/s] of the synchronous motor 41:

$$Ea = 0.5 \times J \times \omega_{max}^2 \tag{4}$$

Thus, the allowable maximum speed value $\omega_{max}$ [rad/s] can be given by the following formula:

$$\omega_{max} = \alpha \times \sqrt{(2 \times Ea J)} \tag{5}$$

However, α is a safety factor of one or less and can be calculated by the following formula:

$$\alpha = Ra/(Rm + Ra) \tag{6}$$

where Rm is the winding resistance of the synchronous motor; Ra, the DB resistance.

Next, at Step S105, the controller 11 puts the synchronous motor 41 in normal operation. Specifically, the speed control unit 2 which configures the controller 11 controls the amplifier 30 for causing the synchronous motor 41 to operate at a predetermined commanded speed. In the event of a failure of the synchronous motor 41, the DB circuit 32 is controlled for short-circuiting the input terminal of the synchronous motor 41 by DB resistance (not illustrated).

At Step S106, the speed control unit 2 acquires an allowable maximum speed value from the allowable maximum speed calculation unit 5, and limits the commanded speed to the allowable maximum speed value or lower.

As described above, the synchronous motor 41 can be operated while maintaining the speed at the allowable maximum speed value or lower, which prevents the DB resistor from getting damaged even when the input terminal of the synchronous motor 41 is short-circuited by the DB resistance in the event of a failure of the synchronous motor 41, and completely stops the synchronous motor.

Second Embodiment

Figure 3:
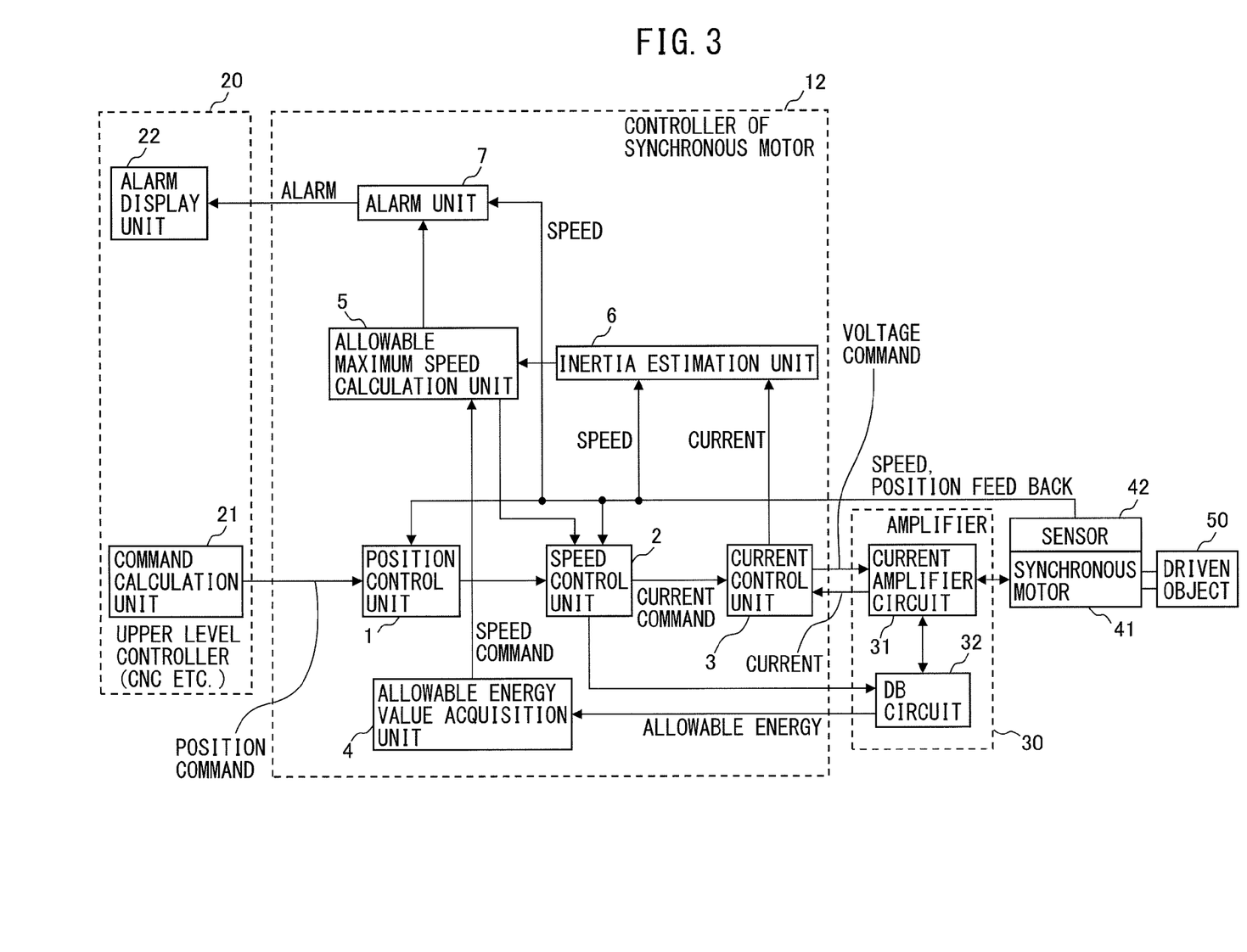
FIG. 3 is a block view illustrating a configuration of the controller of the synchronous motor according to a second embodiment of the invention.

The following is a description of the controller of the synchronous motor according to a second embodiment. FIG. 3 illustrates a block view representing a configuration of the controller of the synchronous motor according to the second embodiment. The controller 12 of the synchronous motor of the second embodiment is different from the controller 11 of the synchronous motor of the first embodiment in a point where the controller 12 further includes an alarm unit 7 which acquires the speed value of the synchronous motor 41 fed back from the sensor 42 and the allowable maximum speed value transmitted from the allowable maximum speed calculation unit 5 and, when the speed of the synchronous motor 41 exceeds the allowable maximum speed value, sends alarm to the alarm display unit 22 of an upper level controller 20. Other configurations are the same as the controller 11 of the synchronous motor, and the overlapping descriptions will be omitted.

Figure 4:
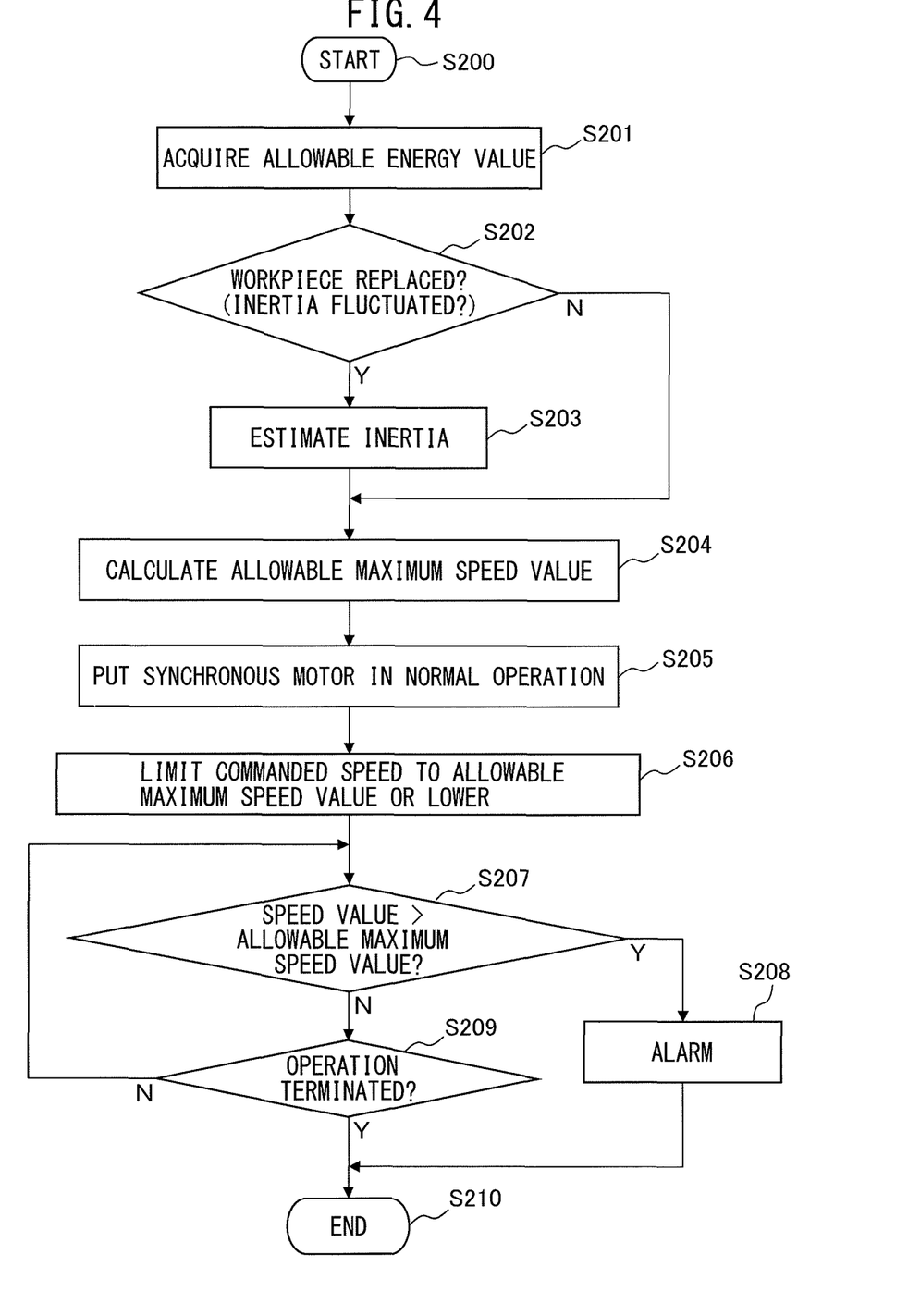
FIG. 4 is a flowchart illustrating the control method of the synchronous motor according to the second embodiment of the invention.

Next, the control method of the synchronous motor according to the second embodiment will be described. FIG. 4 shows a flowchart for illustrating the procedure of the control method of the synchronous motor according to the second embodiment. Steps S201 to S206 are the same as Steps S101 to S106 of the control method of the synchronous motor according to the first embodiment as illustrated in FIG. 2, and the overlapping descriptions will be omitted.

At Step S207, the alarm unit 7 acquires the speed value of the synchronous motor 41 fed back from the sensor 42 as well as the allowable maximum speed value from the allowable maximum speed calculation unit 5, and compares a magnitude relationship between them. If it is determined that the speed value of the synchronous motor 41 exceeds the allowable maximum speed value, at Step S208, the alarm unit 7 sends alarm to the alarm display unit 22 of an upper level controller 20. While, in the second embodiment, the alarm is sent to the alarm display unit 22 of the upper level controller 20, without limitation to this, alarming may be made by emitting an alarm sound from the controller 12 or by other means.

On the other hand, if it is determined that the speed value of the synchronous motor 41 does not exceed the allowable maximum speed value, the alarm unit 7 determines whether the operation of the synchronous motor 41 has terminated at Step S209. If the operation of the synchronous motor 41 has not terminated, the processing returns to Step S207, and continues to compare the magnitude relationship between the speed value and the allowable maximum speed value. On the other hand, if the operation of the synchronous motor 41 has terminated at Step S209, the operation of the controller 12 is terminated.

As described above, according to the controller of the synchronous motor of the second embodiment, alarming is made when the speed value of the synchronous motor 41 exceeds the allowable maximum speed value, a measure to prevent damaging the DB resistor can be taken without delay.

Third Embodiment

Figure 5:
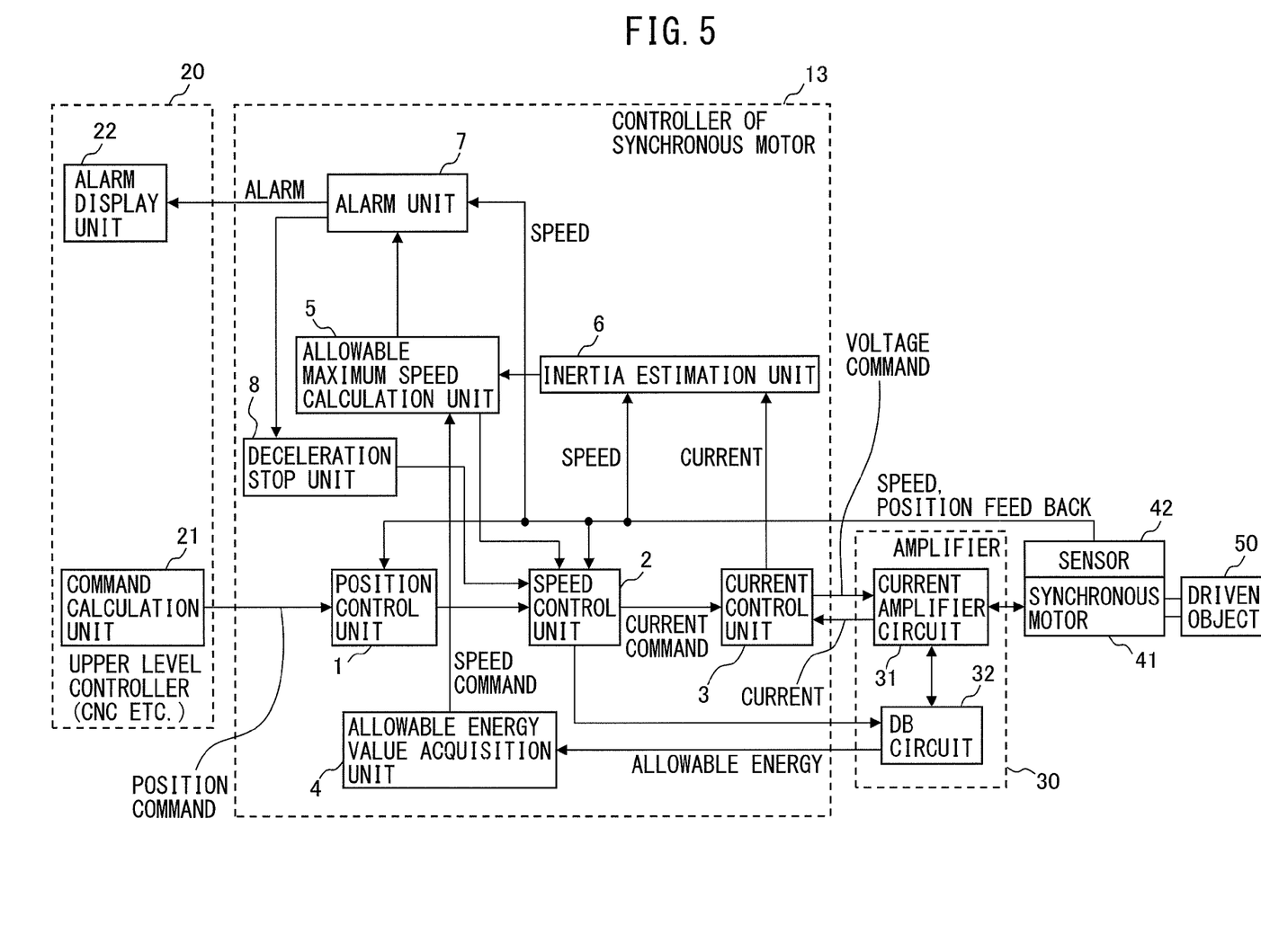
FIG. 5 is a block view illustrating a configuration of the controller of the synchronous motor according to a third embodiment of the invention.

Next, the controller of the synchronous motor according to a third embodiment will be described. FIG. 5 illustrates a block view representing a configuration of the controller of the synchronous motor according to the third embodiment. The controller 13 of the synchronous motor according to the third embodiment is different from the controller 12 of the synchronous motor of the second embodiment in a point where the controller 13 further includes a deceleration stop unit 8 which emits a stop command for deceleration-stopping the synchronous motor 41 to the speed control unit 2 according to the alarm from the alarm unit 7 when the speed of the synchronous motor 41 exceeds the allowable maximum speed value. The other configurations are the same as the controller 12 of the synchronous motor according to the second embodiment, and the overlapping descriptions will be omitted.

Figure 6:
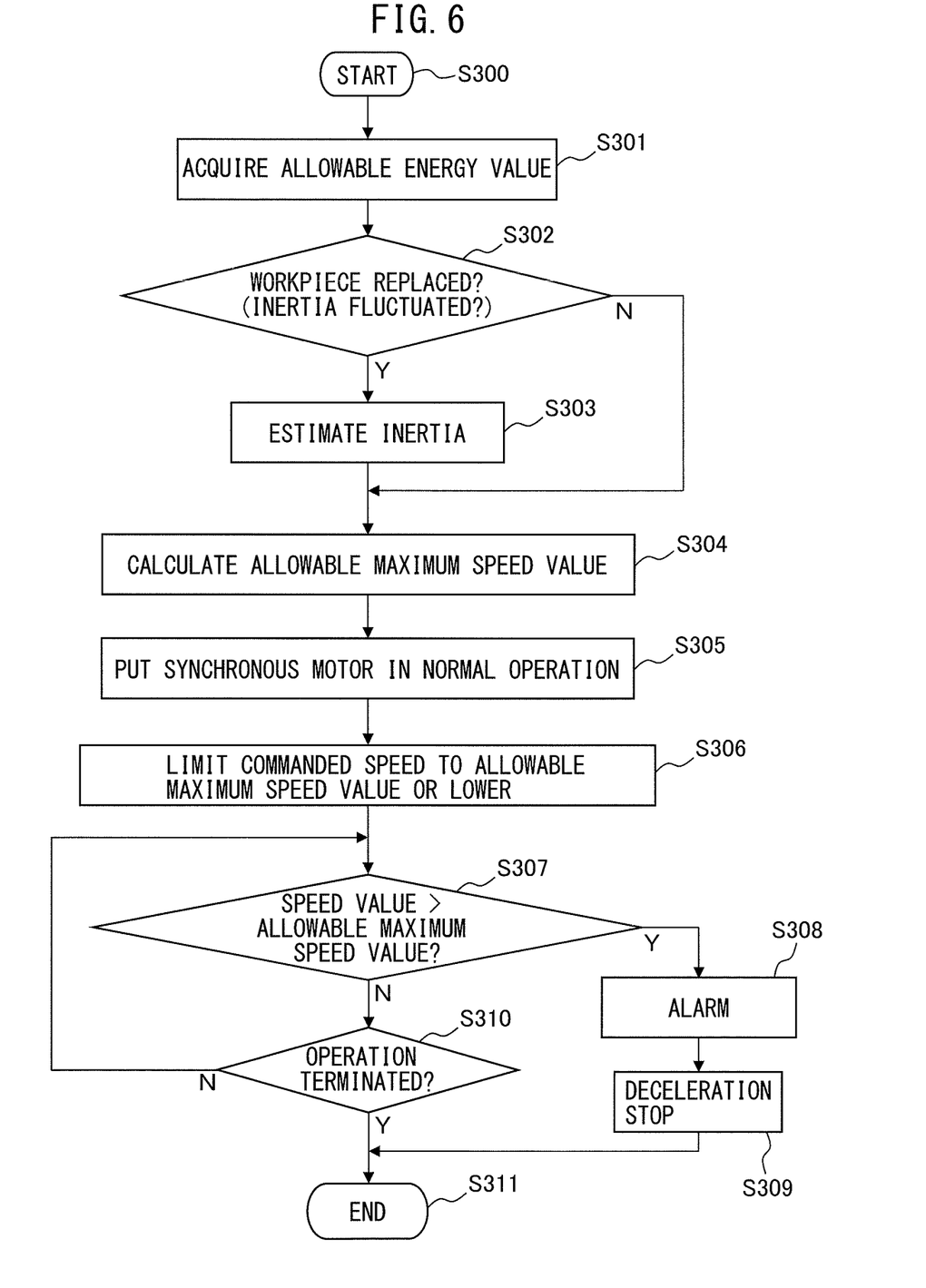
FIG. 6 is a flowchart illustrating the control method of the synchronous motor according to the third embodiment of the invention.

Next, the control method of the synchronous motor according to the third embodiment will be described. FIG. 6 illustrates a flowchart for illustrating the procedure of the control method of the synchronous motor according to the third embodiment. Steps S301 to S306 are the same as Steps S201 to S206 of the control method of the synchronous motor of the second embodiment as illustrated in FIG. 4, and the overlapping descriptions will be omitted.

At step S307, the alarm unit 7 acquires the speed value of the synchronous motor 41 fed back from the sensor 42 as well as the allowable maximum speed value from the allowable maximum speed calculation unit 5, and compares the magnitude relationship between them. If it is determined that the speed value of the synchronous motor 41 exceeds the allowable maximum speed value, the alarm unit 7 sends alarm to the alarm display unit 22 of an upper level controller 20 at Step S308. Further, at Step S309, if the speed of the synchronous motor 41 exceeds the allowable maximum speed value, the deceleration stop unit 8 transmits a stop command for deceleration-stopping the synchronous motor 41 to the speed control unit 2 according to the alarm from the alarm unit 7.

On the other hand, if it is determined that the speed value of the synchronous motor 41 does not exceed the allowable maximum speed value, whether the operation of the synchronous motor 41 has terminated is determined at Step S310. If the operation of the synchronous motor 41 has not terminated, the processing returns to Step S307, and continues to compare the magnitude relationship between the speed value and the allowable maximum speed value. On the other hand, if the operation of the synchronous motor 41 has terminated at Step S310, the operation of the controller 13 is terminated.

As described above, according to the controller of the synchronous motor of the third embodiment, as the synchronous motor 41 is deceleration-stopped when the speed value of the synchronous motor 41 exceeds the allowable maximum speed value, a measure to prevent damaging the DB resistor can be automatically taken.

What is claimed is:

1. A controller of a synchronous motor comprising:
   an allowable energy value acquisition unit which acquires an allowable energy value until which a dynamic brake resistor can bear, the dynamic brake resistor being for short-circuiting an input terminal of the synchronous motor at a time of failure;
   an inertia estimation unit which estimates inertia of a driven object based on a speed value which is fed back from the synchronous motor while the synchronous motor is driving the driven object and an electric current value which is fed back from an amplifier and input to the synchronous motor;
   an allowable maximum speed calculation unit which calculates an allowable maximum speed value of the synchronous motor from the inertia and the allowable energy value; and
   a speed control unit which controls the amplifier for operating the synchronous motor at a predetermined commanded speed,
   wherein the speed control unit acquires the allowable maximum speed value from the allowable maximum speed calculation unit, and limits the commanded speed to the allowable maximum speed value or lower.

2. The controller of the synchronous motor according to claim 1, further comprising:
   an alarm unit which acquires the speed value and the allowable maximum speed value, and alarms when the speed of the synchronous motor exceeds the allowable maximum speed value.

3. The controller of the synchronous motor according to claim 2, further comprising:
   a deceleration stop unit which transmits a stop command to the speed control unit for deceleration-stopping the synchronous motor according to the alarm from the alarm unit when the speed of the synchronous motor exceeds the allowable maximum speed value.

4. A control method of a synchronous motor comprising the steps of:
   acquiring an allowable energy value until which a dynamic brake resistor can bear, the dynamic brake resistor being for short-circuiting an input terminal of the synchronous motor at a time of failure;
   estimating inertia of a driven object based on a speed value which is fed back from the synchronous motor while the synchronous motor is driving the driven object and an electric current value which is fed back from an amplifier and input to the synchronous motor;
   calculating an allowable maximum speed value of the synchronous motor from the inertia and the allowable energy value;

controlling the amplifier for operating the synchronous motor at a predetermined commanded speed; and acquiring the allowable maximum speed value from the allowable maximum speed calculation unit and limiting the commanded speed to the allowable maximum speed value or lower.

* * * * *